(12) United States Patent
Krebs (10) Patent No.: US 8,991,003 B2
(45) Date of Patent: Mar. 31, 2015

(54) VACUUM CLEANER WITH FILTER CARTRIDGE

(71) Applicant: BISSELL Homecare, Inc., Grand Rapids, MI (US)

(72) Inventor: Alan J. Krebs, Pierson, MI (US)

(73) Assignee: BISSELL Homecare, Inc., Grand Rapids, MI (US)

( * ) Notice: Subject to any disclaimer, the term of this patent is extended or adjusted under 35 U.S.C. 154(b) by 0 days.

(21) Appl. No.: 14/032,902

(22) Filed: Sep. 20, 2013

(65) Prior Publication Data

US 2014/0109337 A1    Apr. 24, 2014

Related U.S. Application Data

(60) Provisional application No. 61/715,404, filed on Oct. 18, 2012.

(51) Int. Cl.
| | |
|---|---|
| *A47L 9/10* | (2006.01) |
| *A47L 9/16* | (2006.01) |
| *A47L 9/12* | (2006.01) |
| *B01D 46/20* | (2006.01) |
| *B01D 50/00* | (2006.01) |

(52) U.S. Cl.
CPC .............. *A47L 9/127* (2013.01); *A47L 9/1666* (2013.01); *B01D 46/20* (2013.01); *B01D 50/002* (2013.01); *B01D 2279/55* (2013.01)
USPC .................................. 15/352; 15/319; 15/339

(58) Field of Classification Search
CPC ........... A47L 9/106; A47L 9/127; A47L 9/16; A47L 9/1616; A47L 9/1675
USPC ............................................ 15/352, 319, 339
IPC ....................................... A47L 9/12, 9/14, 9/16
See application file for complete search history.

(56) References Cited

U.S. PATENT DOCUMENTS 2,722,993 A    11/1955 Gerber et al.

FOREIGN PATENT DOCUMENTS

| EP | 0322387 A2 | 12/1988 |
|---|---|---|
| GB | 1072791 A | 6/1967 |
| GB | 2323775 A | 10/1998 |
| KR | 1020110121389 A | 11/2011 |
| WO | 9933387 | 7/1999 |
| WO | 03075732 A1 | 9/2003 |

OTHER PUBLICATIONS

Rhodri Evans, Search Report under Section 17, 4 pages, Dec. 23, 2013, Intellectual Property Office, South Wales, UK.

*Primary Examiner* — David Redding
(74) *Attorney, Agent, or Firm* — McGarry Bair PC (57) ABSTRACT

A vacuum cleaner with a separation module includes an advanceable filter media for filtering a debris-containing working airstream. The filter media can extend over an exhaust grill having openings through which air may pass. The filter media can be mounted on a pair of moveable reels, such that the filter media can periodically be replaced with new filter media.

19 Claims, 6 Drawing Sheets

VACUUM CLEANER WITH FILTER CARTRIDGE

CROSS-REFERENCE TO RELATED APPLICATION

This application claims the benefit of U.S. Provisional Patent Application No. 61/715,404, filed Oct. 18, 2012, which is incorporated herein by reference in its entirety.

BACKGROUND

Upright vacuum cleaners employing separation modules are well known. Some separation modules use frusto-conical-shaped separators and others use high-speed rotational motion of the air/debris to separate the debris (which may include dirt, dust, soil, hair, and other debris) by centrifugal force. Typically, working air enters and exits at an upper portion of the separation module and the bottom portion of the separation module is used to collect debris. Before exiting the separation module or passing to a downstream separation stage, the working air may flow through an exhaust grill. The exhaust grill can have openings through which air may pass. The openings may be defined by perforations or holes, or may be defined between spaced vanes or louvers. In some cases, a foam filter is provided inside or on the exterior of the exhaust grill. During operation, the foam filter may become clogged with debris, which inhibits or prevents air flow through the vacuum cleaner. A user must then stop vacuuming to clean or replace the foam filter.

BRIEF SUMMARY

According to one aspect of the invention, a vacuum cleaner includes a housing comprising a suction nozzle, a suction source provided on the housing in fluid communication with the suction nozzle for creating a working airstream through the housing, and a filter assembly positioned within the working airstream, the filter assembly having a supply reel, a take-up reel, and a filter media wound about the supply reel and connected to the take-up reel, and positioned within the path of the working airstream to filter air passing through the filter assembly, wherein the filter media can be advanced from the supply reel to the take-up reel by rotation of the supply and take-up reels.

According to another aspect of the invention, a vacuum cleaner includes a housing comprising a suction nozzle, a suction source provided on the housing in fluid communication with the suction nozzle, a cyclone separator having at least one separation chamber for separating contaminants from a debris-containing working airstream and comprising an air inlet in fluid communication with the suction nozzle and an air outlet, a collection chamber adjacent to the cyclone separator for receiving contaminants separated by the cyclone separator, an exhaust grill defining at least one opening in fluid communication with the air outlet, and a roll of filter media having a portion overlying the at least one opening of the exhaust grill to filter air passing through the exhaust grill, wherein the filter media is advanced relative to the exhaust grill to replace the portion overlying the at least one opening of the exhaust grill with an unused portion of the filter media.

DETAILED DESCRIPTION

The invention relates to vacuum cleaners and in particular to vacuum cleaners having cyclonic dirt separation. In one of its aspects, the invention relates to an improved exhaust grill for a cyclone module assembly. For purposes of description related to the figures, the terms "upper," "lower," "right," "left," "rear," "front," "vertical," "horizontal," and derivatives thereof shall relate to the invention as oriented in FIG. 1 from the perspective of a user behind the vacuum cleaner, which defines the rear of the vacuum cleaner. However, it is to be understood that the invention may assume various alternative orientations, except where expressly specified to the contrary.

Figure 1:
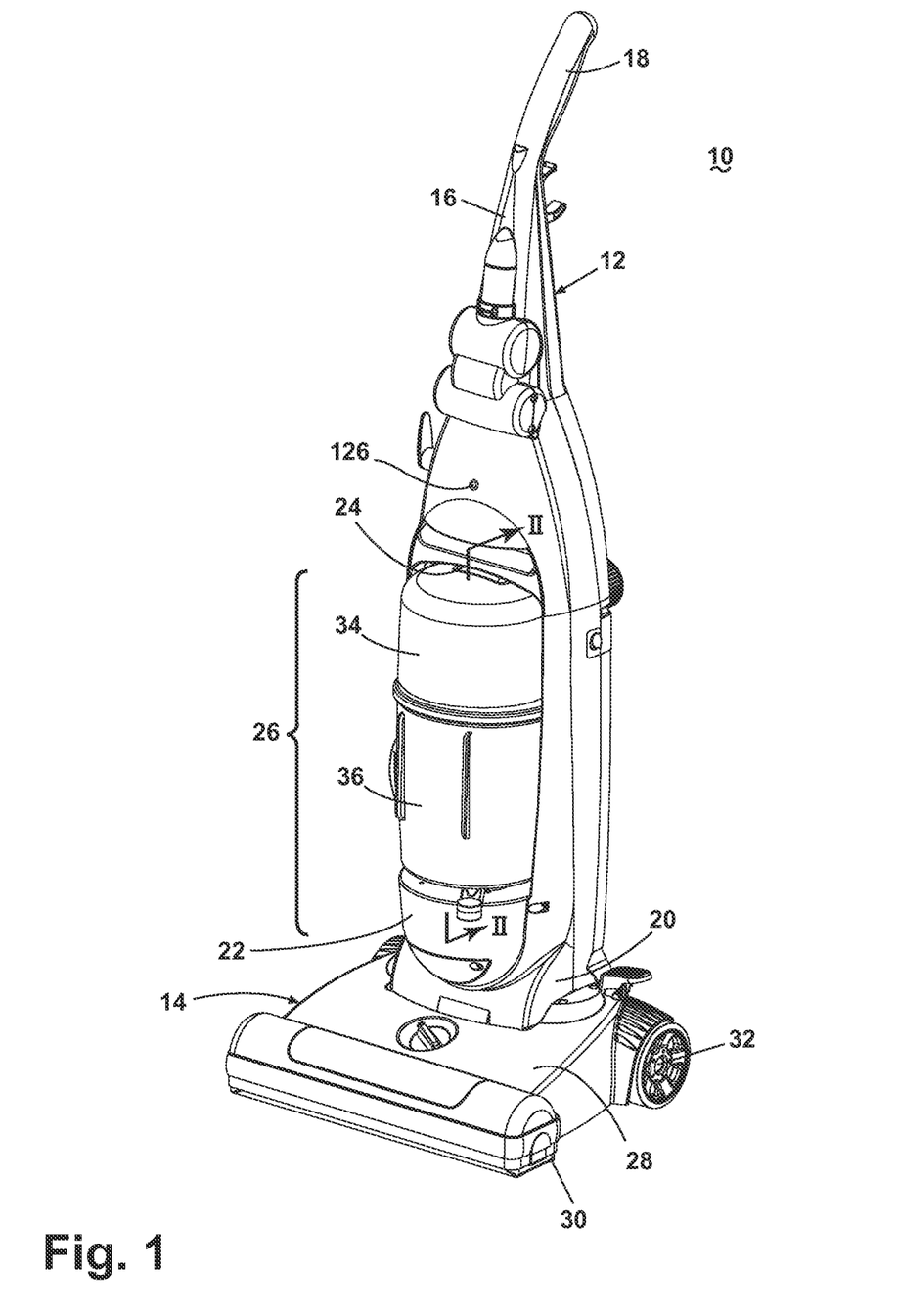
FIG. 1 is a perspective view of a vacuum cleaner having a separation module according to a first embodiment of the invention.

Referring to the drawings, and in particular to FIG. 1, an upright vacuum cleaner 10 comprises housing illustrated as an upright handle assembly 12 and a foot assembly 14 pivotally mounted to the upright handle assembly 12. The handle assembly 12 further comprises a primary support section 16 with a grip 18 on one end to facilitate movement by a user. A motor cavity 20 is formed at an opposite end of the handle assembly 12 to contain a conventional suction source such as a vacuum fan/motor assembly (not shown) oriented transversely therein for creating a working airstream through the housing of the vacuum cleaner 10. A post-motor filter housing 22 is formed above the motor cavity 20 and is in fluid communication with the vacuum fan/motor assembly. The handle assembly 12 pivots relative to the foot assembly 14 through a pivot axis that is coaxial with a motor shaft (not shown) associated with the vacuum fan/motor assembly. A mounting section 24 on the primary support section 16 of the handle assembly 12 receives a separation module 26 according to a first embodiment of the invention for separating debris (which may include dirt, dust, soil, hair, and other debris) and other contaminants from the debris-containing working airstream created by the suction source and collecting the debris for later disposal. As illustrated herein, the separation module 26 is shown as a cyclone module assembly 26. However, it is understood that other types of separation modules can be used, such as centrifugal separators or bulk separators.

The foot assembly 14 comprises a housing 28 with a suction nozzle 30 formed at a lower surface thereof and that is in fluid communication with the vacuum fan/motor assembly. While not shown, an agitator can be positioned within the housing 28 adjacent the suction nozzle 30 and operably connected to a dedicated agitator motor, or to the vacuum fan/motor assembly within the motor cavity 20 via a stretch belt as is common in the vacuum cleaner art. Rear wheels 32 are secured to a rearward portion of the foot assembly 14 and a pair of support wheels (not shown) are secured to a forward portion of the foot assembly 14 for moving the foot assembly 14 over a surface to be cleaned.

Figure 2:
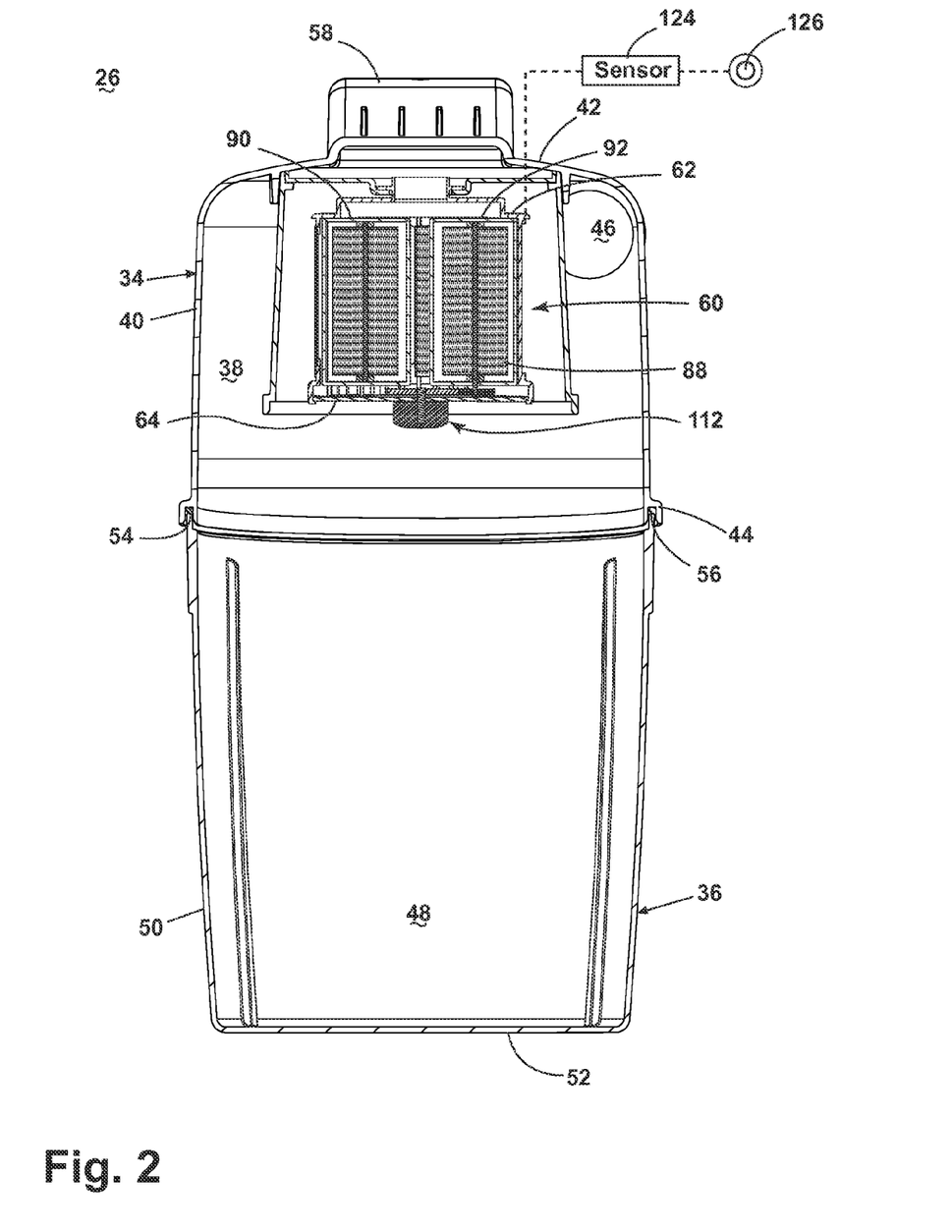
FIG. 2 is a cross-sectional view through line II-II of the separation module of FIG. 1.

FIG. 2 is a sectional view through the separation module 26 of FIG. 1. The separation module 26 illustrated herein comprises a single-stage cyclone separator 34 for separating contaminants from the debris-containing working airstream and a dirt cup 36 which receives contaminants separated by the cyclone separator 34. The cyclone separator 34 defines a separation chamber 38 and comprises a side wall 40, a top wall 42, and an open bottom defined by an edge 44. An inlet 46 to the separation chamber 38 is formed in the side wall 40 and can be defined by an inlet conduit extending outwardly from the side wall 40. While not illustrated, the inlet 46 is in fluid communication with the suction nozzle 30 (FIG. 1).

The dirt cup 36 defines a collection chamber 48, and comprises a side wall 50, a bottom wall 52, and an open top defined by an edge 54 that is selectively joined to the bottom edge 44 of the cyclone separator 34. A gasket 56 can be provided between the edges 44, 54. While the separation chamber 38 and collection chamber 48 are shown herein as being defined by separate housings, it is also contemplated that the separation chamber 38 and collection chamber 48 can be defined by a common or integral housing. In this case, the bottom wall 52 defining the collection chamber 48 can be provided with a dirt door for selectively releasing debris collected therein. In this case, the separation module can be referred to as a "bottom-empty" separation module.

An air outlet 58 from the separation module 26 can be provided in the top wall 42 of the cyclone separator 34. While not illustrated, the outlet 58 is in fluid communication with the suction source in the motor cavity 20 (FIG. 1). The separation module 26 further comprises a filter assembly 60 positioned within the separation chamber 38, downstream of the outlet 58. The filter assembly 60 can be at least partially detachably mounted within the separation module 26 and includes a filter housing 62, a bottom cover 64, and a replaceable, dual-cartridge filter 66.

Figure 3:
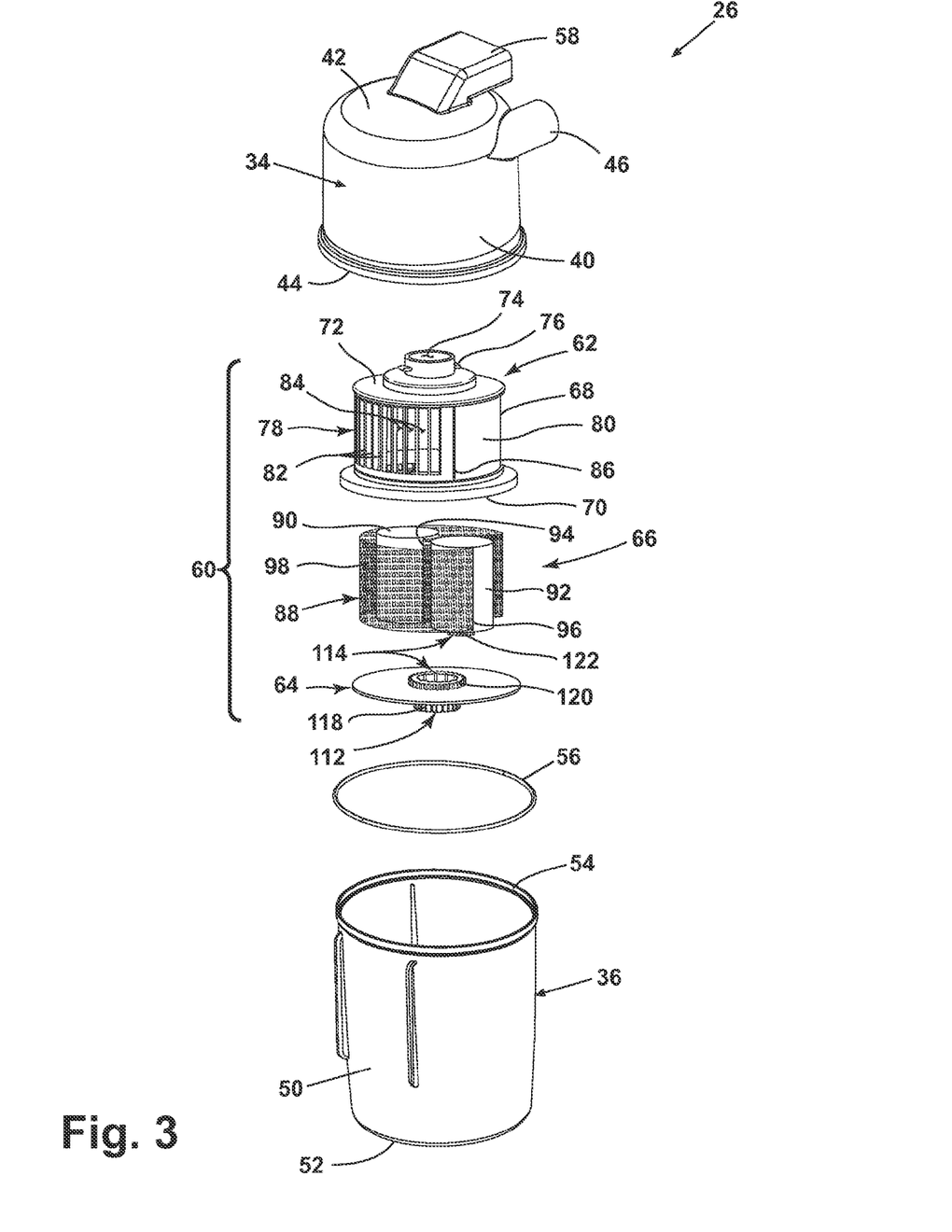
FIG. 3 is an exploded view of the separation module of FIG. 1, the separation module including a filter assembly.

FIG. 3 is an exploded view of the separation module 26. The filter housing 62 comprises a cylindrical body having a side wall 68, an open bottom defined by a bottom edge 70, and a top wall 72. The top wall 72 includes an opening defining an air outlet 74 from the filter assembly 60. The top wall 72 can further include means for attaching the filter housing to the separation module 26, such as a screw-type or bayonet fastener 76. The bottom cover 64 is removably attached to the bottom edge 70 of the filter housing 62, and closes the open bottom of the filter housing 62.

The side wall 68 is provided with an exhaust grill 78 and a closed portion 80. The exhaust grill 78 includes a plurality of vertical vanes or louvers 82 and openings 84, which are defined between adjacent louvers 82. The openings 84 provide an air inlet to the filter assembly 60. Two slots 86 are provided in the side wall 68, on either side of the exhaust grill 78. The closed portion 80 of the side wall 68 may be positioned adjacent the inlet 46 of the separation module 26, and prevents working air entering the cyclone separator 34 from immediately passing through the filter assembly 60. Instead, the working air must travel at least partially around the cyclone separator 34, which increases separation efficiency.

Figure 4:
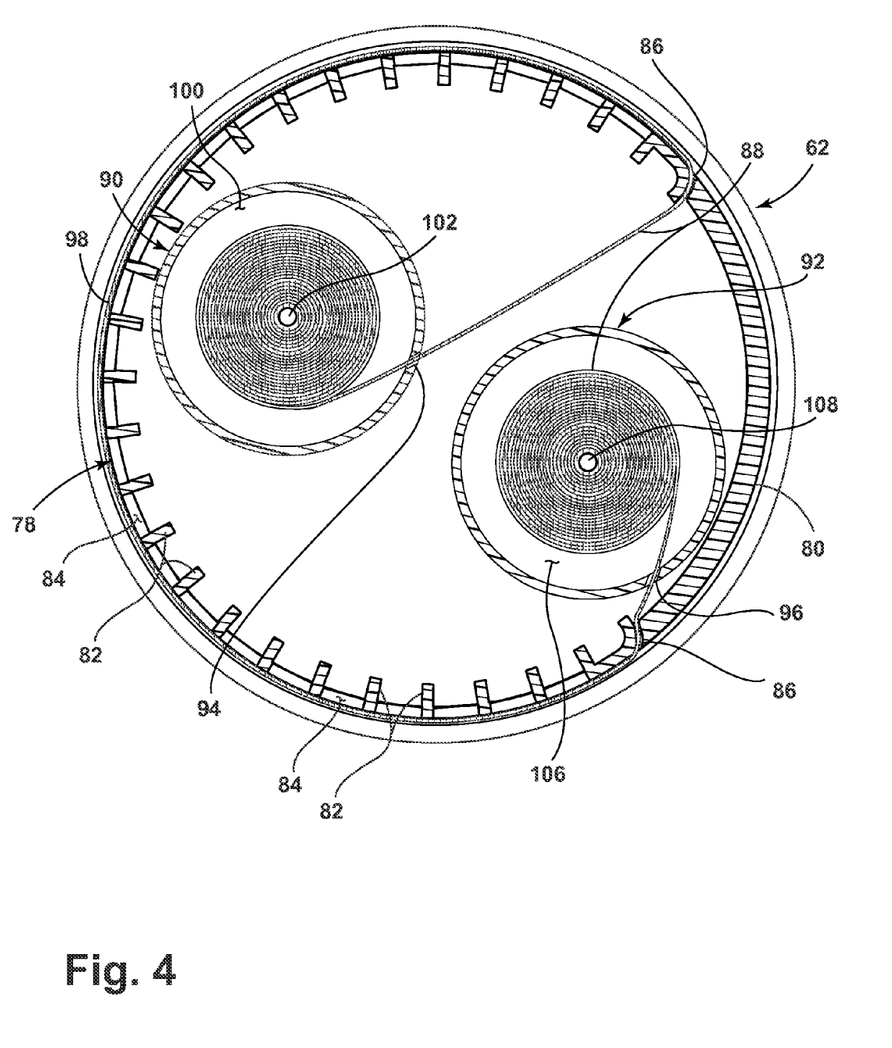
FIG. 4 is a top cross-sectional view through the filter assembly of FIG. 3.

The dual-cartridge filter 66 comprises a roll of sheet-type filter media 88 and two cartridges, including a supply cartridge 90 which holds unused filter media 88 and a take-up cartridge 92 which collects and holds soiled filter media 88. The cartridges 90, 92 can be fixedly mounted within the filter housing 62, and removable therefrom as unit since they are connected to each other by the filter media 88. As best shown in FIG. 4, the supply cartridge 90 includes a slot 94 providing an exit for unused filter media 88 and the take-up cartridge 92 includes a similar slot 96 providing an entrance for the soiled filter media 88.

The filter media 88 stretches between the supply cartridge 90 and the take-up cartridge 92, such that there is an exposed portion 98 of the filter media 88 which is positioned to filter air passing through the filter housing 62. The exposed portion 98 can overlie the openings 84 of the exhaust grill to filter air passing through the exhaust grill 78. Specifically, in the embodiment shown herein, the filter media 88 extends between the slots 94, 96 and is threaded through the slots 86 in the filter housing 62, such that the exposed portion 98 of the filter media 88 is located on the exterior of the filter housing 62, over the exhaust grill 78. Alternatively, the exposed portion 98 of the filter media 88 can be located on the interior of the filter housing 62, but still overlie the exhaust grill 78.

Although not shown in the figures, alignment features can be formed on the filter housing 62 for aligning the filter media 88 on the exterior of the filter housing 62, relative to the openings 84. Examples of alignment features can include flanges or channels that engage the edges of the filter media 88 to limit its vertical position so that the filter media 88 always covers the openings 84 and filters air passing therethrough. Alternatively, the height of the openings 84 can be reduced, which increases the overlap between the upper and lower edges of filter media 88 and solid portion of the filter housing 62 so that the filter media 88 always covers the openings 84 and filters air passing therethrough.

The filter media 88 can comprise a long, thin sheet of an air filtration material. One example is a porous, melt-blown sheet material, such as polypropylene, polyethylene terephthalate, or fine glass fiber sheets. The filter media 88 can further comprise a fragrance additive and/or an odor eliminator, one example of which is Febreze®.

Figure 5:
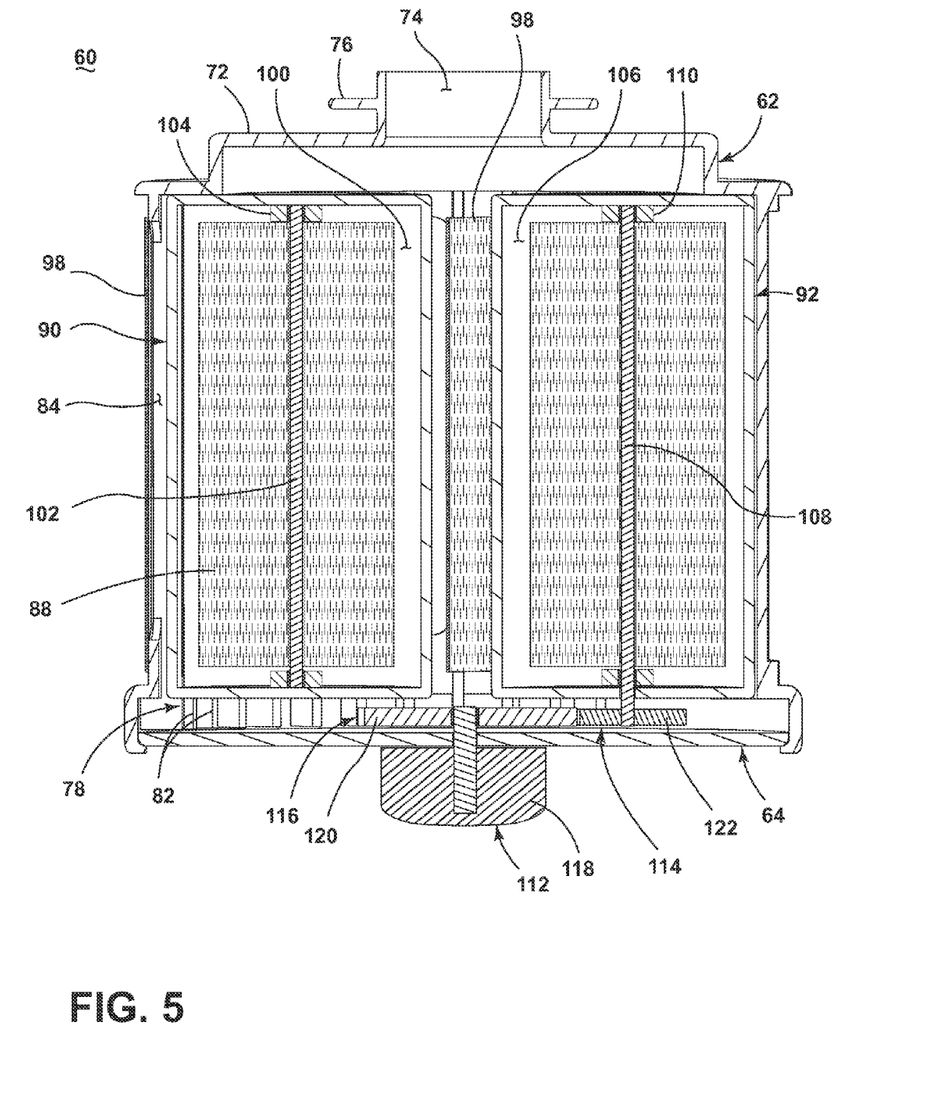
FIG. 5 is a side cross-sectional view through the filter assembly of FIG. 3.

FIG. 5 is a cross-sectional view through the filter assembly 60. The supply cartridge 90 comprises an internal chamber 100 which contains a supply reel 102 on which the unused filter media 88 is wound. The supply reel 102 is supported within the supply cartridge 90 for rotation, such as via a bearing assembly 104. When initially installed, the supply reel 102 can hold a roll of the filter media 88, with one end of the filter media 88 coupled to the supply reel 102.

The take-up cartridge 92 comprises an internal chamber 106 which contains a take-up reel 108 on which the soiled filter media 88 is wound. The take-up reel 108 is supported within the take-up cartridge 92 for rotation, such as via a bearing assembly 110. When initially installed, the take-up reel 108 can hold very little filter media 88, with one end of the filter media 88 coupled to the take-up reel 108. The take-up reel 108 is adapted to collect soiled filter media 88 by rotating to wrap the filter media 88 around the reel 108, which also acts to pull unused filter media 88 off the supply reel 102.

The bottom cover 64 includes an actuator 112 for a filter advancing mechanism 114, which controls the movement of the filter media 88 onto the take-up reel 108 and off of the supply reel 102. The example of the filter advancing mechanism 114 shown herein comprises a gear train 116 coupling the actuator 112 to the take-up roll 108. The actuator 112 shown herein is a rotatable knob 118 provided on the exterior surface of the cover 64 which is coupled to a drive gear 120 provided on the interior surface of the cover 64. The drive gear 120 is enmeshed with a driven gear 122 which is fixedly coupled to the take-up reel 108. Rotation of the knob 118 is transmitted to the take-up reel 108 via the enmeshed gears 120, 122, such that when a user rotates the knob 118, the take-up reel 108 rotates to pull the filter media 88 across the exhaust grill 78 and around the take-up reel 108. The force on the filter media 88 also rotates the supply reel 102 as unused filter media 88 is pulled off the supply reel 102.

The dual-cartridge filter 66 is positioned so that the exposed portion 98 of the filter media 88 wraps around the exterior side of the exhaust grill 78. As the exposed portion 98 of the filter media 88 becomes clogged with debris during use, the user can manually index the take-up reel 108, by rotating the knob 118, to pull a clean, fresh portion of filter media 88 from the supply reel 102 around the exhaust grill 78. The soiled portion of the filter media is collected by the take-up reel 108. Thus, the user does not have to remove the filter assembly 60 from the vacuum cleaner 10 in order to replace the exposed portion 98 of the filter 88. In the illustrated embodiment, the user can remove the dirt cup 36 to access the knob 118. When provided on a bottom-empty separation module, the user can remove the separation module from the vacuum cleaner and open the dirt door to access the knob 118.

The filter advancing mechanism 114 can be an indexable mechanism, such that one particular operation is repeated at defined intervals of actuator 112 movement. In one example, one full rotation of the knob 118 can be sufficient to replace the soiled filter media over the exhaust grill 78 with unused filter media. In another example, half of a full rotation of the knob 118 can be sufficient to replace the soiled filter media over the exhaust grill 78 with unused filter media. The filter advancing mechanism 114 can be provided with a user feedback feature which can let a user know when the knob 118 has been rotated a sufficient amount to replace the soiled filter media over the exhaust grill 78 with unused filter media, such as by providing tactile feedback or audible feedback, such as a click sound.

Referring to FIG. 2, a sensor 124 can be provided for detecting a condition indicative of the need to replace the filter media 88. The sensor 124 can alert the user to the condition, such as by turning on an indicator light 126 on the vacuum cleaner 10. When the indicator light 126 is on, the user is prompted to manually index the take-up reel 108 to pull a clean, fresh portion of filter media 88 from the supply reel 102 around the exhaust grill 78. One example of a suitable sensor 124 is an airflow sensor that detects a decrease in air velocity through the working air flow path through the vacuum cleaner. This type of sensor 124 can detect a clogged condition of the filter media 88, i.e. when the exposed portion 98 becomes so soiled that air flow through the filter assembly 60 is inhibited. Another example of a suitable sensor 124 is a pressure sensor that detects a drop in pressure in the working air flow path through the vacuum cleaner, which also detects a clogged condition of the filter media 88. In yet another example, the sensor 124 can detect an operating time of the vacuum cleaner, and be configured to prompt the user to replace the filter media 88 after a predetermined operating time has elapsed.

Figure 6:
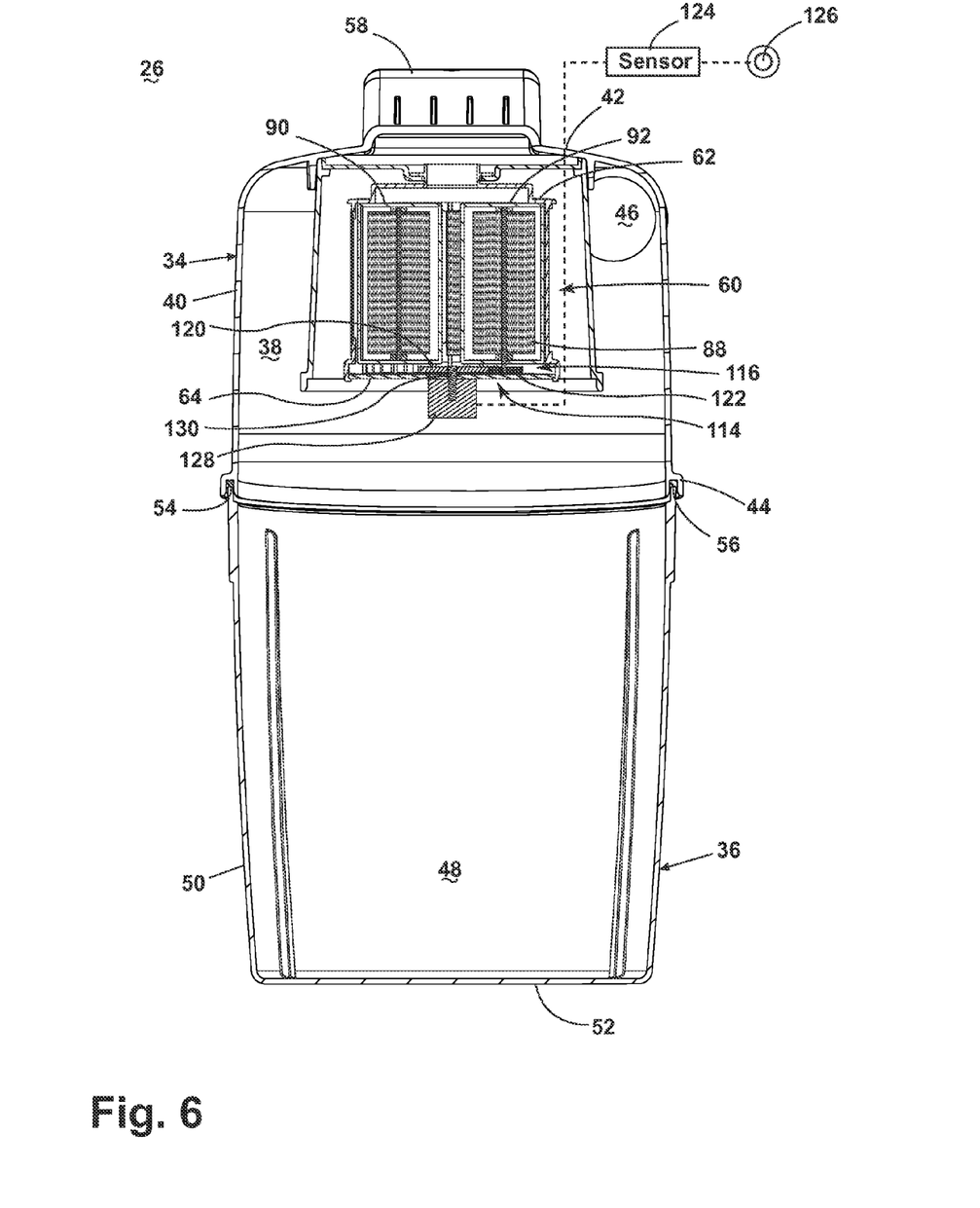
FIG. 6 is a cross-sectional view through a separation module according to a second embodiment of the invention.

FIG. 6 is a cross-sectional view through a separation module 26 according to a second embodiment of the invention. The second embodiment of the separation module 26 can be substantially similar to the first embodiment, and like elements are referred to with the same reference numerals. The second embodiment of the separation module 26 can be used with the vacuum cleaner 10 shown in FIG. 1, and differs from the first embodiment in that the filter advancing mechanism 114 is automated. The sensor 124 can be coupled to the automatic filter advancing mechanism 114 and can trigger the mechanism 114 to automatically index the take-up reel 108 when the exposed portion 98 of the filter media 88 needs to be replaced. One example of a suitable automatic filter advancing mechanism 114 comprises a motor 128 coupled to the take-up reel 108. The motor 128 can have a drive shaft 130 which is coupled to the gear train 116 to drive the drive gear 120 when the motor 128 is activated by the sensor 124.

The motor 128 can be supported by the bottom cover 64, or elsewhere within the separation module 26. In one example (not shown), the automatic filter advancing mechanism 114 can be positioned near the top of the separation module 26, with the filter assembly 60 depending therefrom, such that the filter assembly 60 can be removed from the separation module 26 without removing the motor 128. In this example, the drive shaft 130 of the motor 128 can releasably couple with the gear train 116 to selectively attach or remove the filter assembly 60 from the separation module 26.

While the invention has been specifically described in connection with certain specific embodiments thereof, it is to be understood that this is by way of illustration and not of limitation. For example, while the filter assemblies illustrated herein are shown mounted within the separation chamber of a single stage cyclone separator, it is understood that the filter assemblies could be applied to a dual stage separator, multiple parallel first and/or second stage, or additional downstream separators, or other types of cyclone separators. Moreover, the filter assemblies could be mounted downstream from the cyclone separator or suction source. Reasonable variation and modification are possible with the scope of the foregoing disclosure and drawings without departing from the spirit of the invention which, is defined in the appended claims. Hence, specific dimensions and other physical characteristics relating to the embodiments disclosed herein are not to be considered as limiting, unless the claims expressly state otherwise.

What is claimed is:

1. A vacuum cleaner, comprising:
   a housing comprising a suction nozzle;
   a suction source provided on the housing in fluid communication with the suction nozzle for creating a working airstream through the housing; and
   a cyclone separator having at least one separation chamber for separating contaminants from the working airstream and comprising an air inlet in fluid communication with the suction nozzle and an air outlet;
   a collection chamber adjacent to the cyclone separator for receiving contaminants separated by the cyclone separator;
   a filter assembly positioned within the separation chamber, the filter assembly comprising:
      a supply reel;
      a take-up reel; and
      a filter media wound about the supply reel and connected to the take-up reel, and positioned within the path of the working airstream to filter air passing through the filter assembly;
   wherein the filter media can be advanced from the supply reel to the take-up reel by rotation of the supply and take-up reels.

2. The vacuum cleaner from claim 1, wherein the filter assembly further comprises a filter housing mounted within the separation chamber, wherein the supply reel, take-up reel, and filter media are provided in the filter housing.

3. The vacuum cleaner from claim 2, and further comprising a supply cartridge and a take-up cartridge detachably mounted within the filter housing as a unit, wherein the supply reel is rotatably supported within the supply cartridge and the take-up reel is rotatably supported within the take-up cartridge.

4. The vacuum cleaner from claim 1 and further comprising a filter advancing mechanism which controls the rotation of the supply and take-up reels to transfer the filter media from the supply reel to the take-up reel.

5. The vacuum cleaner from claim 4, wherein the filter advancing mechanism comprises a manual actuator coupled to the take-up reel for manually advancing the filter media.

6. The vacuum cleaner from claim 5, wherein the filter advancing mechanism comprises a gear train coupling the actuator to the take-up reel.

7. The vacuum cleaner from claim 4, wherein the filter advancing mechanism comprises a motor coupled to the take-up reel for automatically advancing the filter media.

8. The vacuum cleaner from claim 4, wherein the filter advancing mechanism comprises an indexable mechanism for repeatedly advancing the filter media at defined intervals.

9. A vacuum cleaner, comprising:
a housing comprising a suction nozzle;
a suction source provided on the housing in fluid communication with the suction nozzle;
a cyclone separator having at least one separation chamber for separating contaminants from a debris-containing working airstream and comprising an air inlet in fluid communication with the suction nozzle and an air outlet;
a collection chamber adjacent to the cyclone separator for receiving contaminants separated by the cyclone separator;
an exhaust grill defining at least one opening in fluid communication with the air outlet; and
a roll of filter media having a portion overlying the at least one opening of the exhaust grill to filter air passing through the exhaust grill;
wherein the filter media is advanced relative to the exhaust grill to replace the portion overlying the at least one opening of the exhaust grill with an unused portion of the filter media.

10. The vacuum cleaner from claim 9 and further comprising a sensor for detecting a condition indicative of a need to replace the filter media.

11. The vacuum cleaner from claim 9, wherein the exhaust grill comprises a plurality of louvers and a plurality of openings defined between adjacent louvers, and wherein the portion of the filter media overlies the plurality of openings.

12. The vacuum cleaner from claim 9 and further comprising a filter advancing mechanism which controls the advancement of the filter media relative to the exhaust grill.

13. The vacuum cleaner from claim 12, wherein the filter advancing mechanism comprises a manual actuator coupled to the roll of filter media for manually advancing the filter media.

14. The vacuum cleaner from claim 12, wherein the filter advancing mechanism comprises a motor coupled to the roll of filter media for automatically advancing the filter media.

15. The vacuum cleaner from claim 12, wherein the filter advancing mechanism comprises an indexable mechanism for repeatedly advancing the filter media at defined intervals.

16. The vacuum cleaner from claim 9 and further comprising a supply reel and a take-up reel, wherein the roll of filter media is provided on the supply reel and connected to the take-up reel.

17. The vacuum cleaner from claim 16, wherein the exhaust grill is provided on a filter housing mounted within the separation chamber, wherein the supply reel, take-up reel, and the roll of filter media are provided in the filter housing.

18. The vacuum cleaner from claim 9, wherein the exhaust grill comprises a side wall having a pair of slots, and wherein the filter media passes through the slots.

19. The vacuum cleaner from claim 18, wherein the portion of the roll of filter media overlying the at least one opening is located on an outer surface of the exhaust grill so that debris is captured on an outside surface of the filter media.

* * * * *